C. R. ERVIN.
NUT LOCK.
APPLICATION FILED MAY 20, 1918.

1,289,710.

Patented Dec. 31, 1918.

Witnesses
J. M. Jester

Inventor
C. R. Ervin

By Victor J. Evans
Attorney

UNITED STATES PATENT OFFICE.

CHARLES R. ERVIN, OF CUSHING, OKLAHOMA.

NUT-LOCK.

1,289,710.

Specification of Letters Patent.  Patented Dec. 31, 1918.

Application filed May 20, 1918. Serial No. 235,555.

*To all whom it may concern:*

Be it known that I, CHARLES R. ERVIN, a citizen of the United States, residing at Cushing, in the county of Payne and State of Oklahoma, have invented new and useful Improvements in Nut-Locks, of which the following is a specification.

This invention relates to nut locks, particularly to that type in which the nut is locked in relation to the bolt, and has for its object the provision of a lock nut having associated therewith a ratchet washer keyed upon the bolt, the nut being provided with a pawl engaging the ratchet washer.

An important object is the provision of a nut lock of this character provided with means whereby the reverse rotation of the nut will result in automatically throwing the pawl into engaging relation with the washer for preventing the unscrewing of the nut.

Another object is the provision of a nut lock of this character provided with means whereby the pawl may be moved out of engagement with the ratchet washer whereby the nut may be removed.

With these and other objects and advantages in view, such as simplicity, comparative inexpensiveness, efficiency, durability and the general improvement of the art, my invention consists in the novel construction and arrangement of parts to be hereinafter more fully described and claimed and illustrated in the accompanying drawings, in which:—

Figure 1:
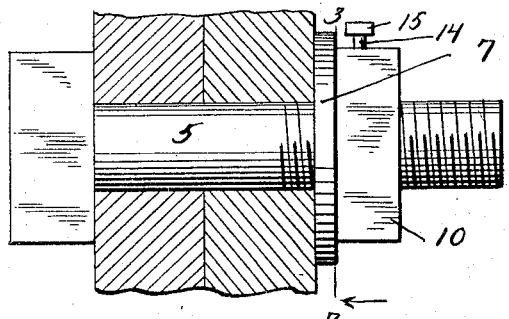
Figure 1 is a side elevation of a bolt equipped with my nut locking device.
Figure 2:
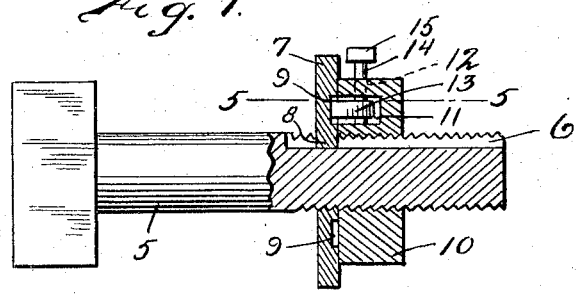
Fig. 2 is a longitudinal sectional view therethrough.
Figure 3:
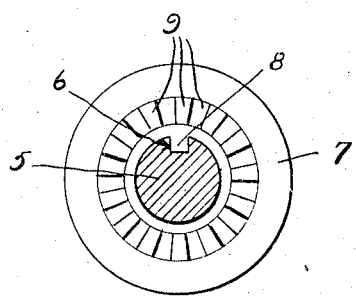
Fig. 3 is a cross sectional view on the line 3—3 of Fig. 1.
Figure 4:
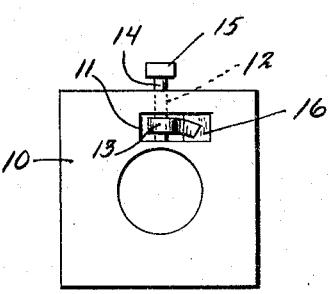
Fig. 4 is a cross sectional view on the same line, looking in the opposite direction.

Referring more particularly to the drawings, the numeral 5 designates a bolt which is provided with a groove or keyway 6. Disposed upon the bolt 5 is a washer 7 having a hole therein for the passage of the bolt, and provided with a tongue 8 engaging within the groove 6 in the bolt. The outer face of the washer 7 has formed therein in any desired manner, a plurality of circumferentially arranged ratchet teeth 9.

Figure 5:
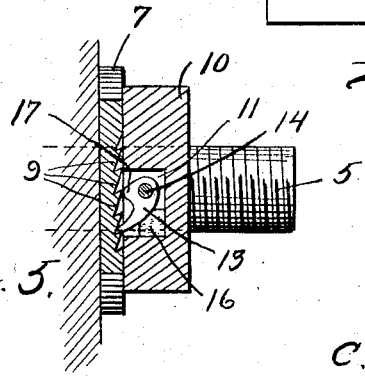
Fig. 5 is a detail cross sectional view through the nut, on the line 5—5 of Fig. 4.

The nut is designated by the numeral 10 and is provided with a central hole threaded on its inner periphery for engagement upon the threaded end of the bolt 5. The face of the nut engaging against the washer 7 is provided with a recess 11 with which communicates a bore 12. A pawl member comprising a head 13 is associated with the nut with the head 13 disposed within the recess 11 and has its shank disposed within the bore 12 and extending outwardly beyond the edge of the nut, its terminal being provided with a head 15 angular in conformation. The head 13 of the pawl member is more clearly shown in Fig. 5 and has its hook-like end urged outwardly away from the bottom of the recess 11 by means of a pad 16 of rubber.

My device is used by sliding the washer 7 onto the bolt 5 and then screwing the nut 10 onto the bolt in the usual manner. When the nut 10 is screwed tight against the washer 7 the pawl member will pass idly over the teeth 9 on the washer, as will be obvious. However, in the event of an attempt to unscrew the nut, the edge 17 of the boss portion of the head 13 will engage against the teeth 9 and have a cam action thereon which will result in tending to swing the head 13 so that its hook-like end will engage within the teeth 9. The rubber pad 16 is merely an auxiliary in accomplishing this action and may be omitted if desired. If, however, the nut needs to be removed, the head 15 on the shank of the pawl member may be grasped with a pair of pliers or similar device and turned so that the hook-like end of the head 13 will be forced into the recess 11 to its maximum extent so as to be entirely out of proximity to the teeth 9 and so that the cam edge 17 of the head will be out of engagement with the teeth 9, whereupon the nut may be readily unscrewed.

From the foregoing description and a study of the drawing, it will be apparent that I have thus provided a nut lock which will be highly efficient in remaining firmly upon a bolt without danger of accidental displacement and which may be capable of authorized removal.

Having thus described my invention what I claim is:—

In combination with a bolt, a washer slidable and non-rotatable thereon and provided on its outer face with a circumferential series of ratchet teeth, a nut threaded upon the bolt and provided with a lateral bore communicating with a recess in its face adjacent the washer, and a pawl member including a shank revoluble through said bore and a head portion carried by said shank and disposed within said recess in position normally engaging said ratchet teeth, said shank being provided with a tool engaging head, whereby said pawl may be rotated out of engagement with said teeth.

In testimony whereof I affix my signature.

CHARLES R. ERVIN.

Copies of this patent may be obtained for five cents each, by addressing the "Commissioner of Patents, Washington, D. C."